Feb. 2, 1943.  G. M. DEMING  2,310,189
AIRCRAFT BREATHING REGULATOR
Filed Oct. 11, 1941  3 Sheets-Sheet 3

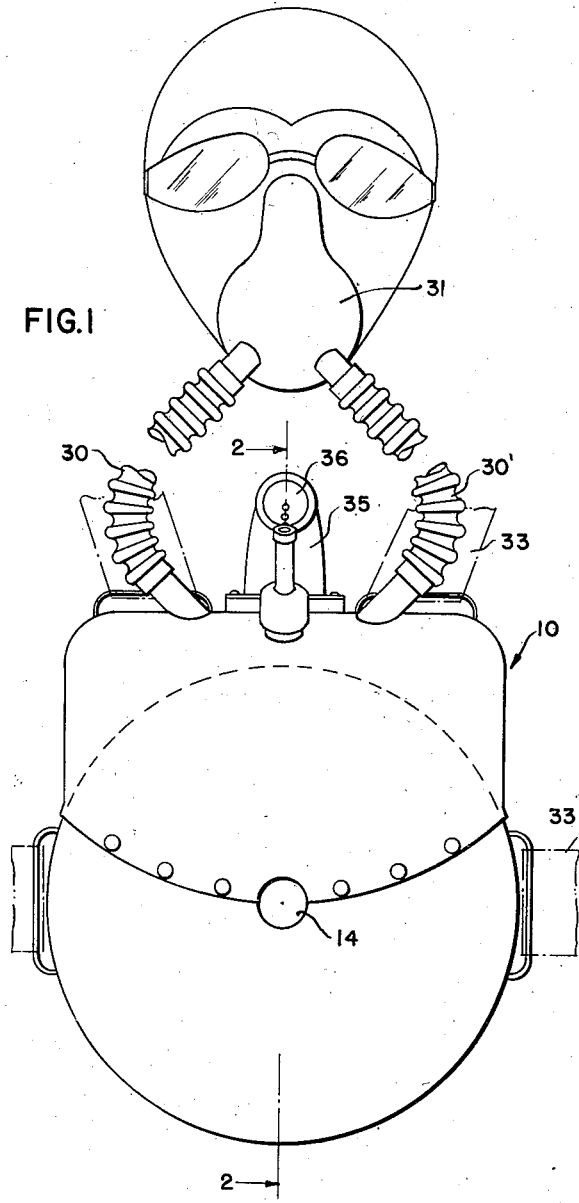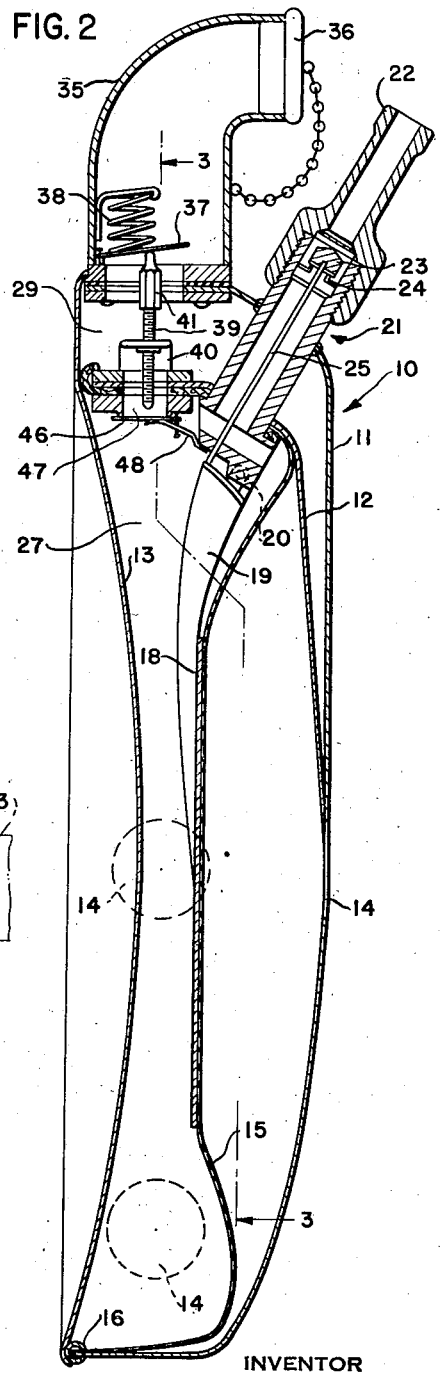

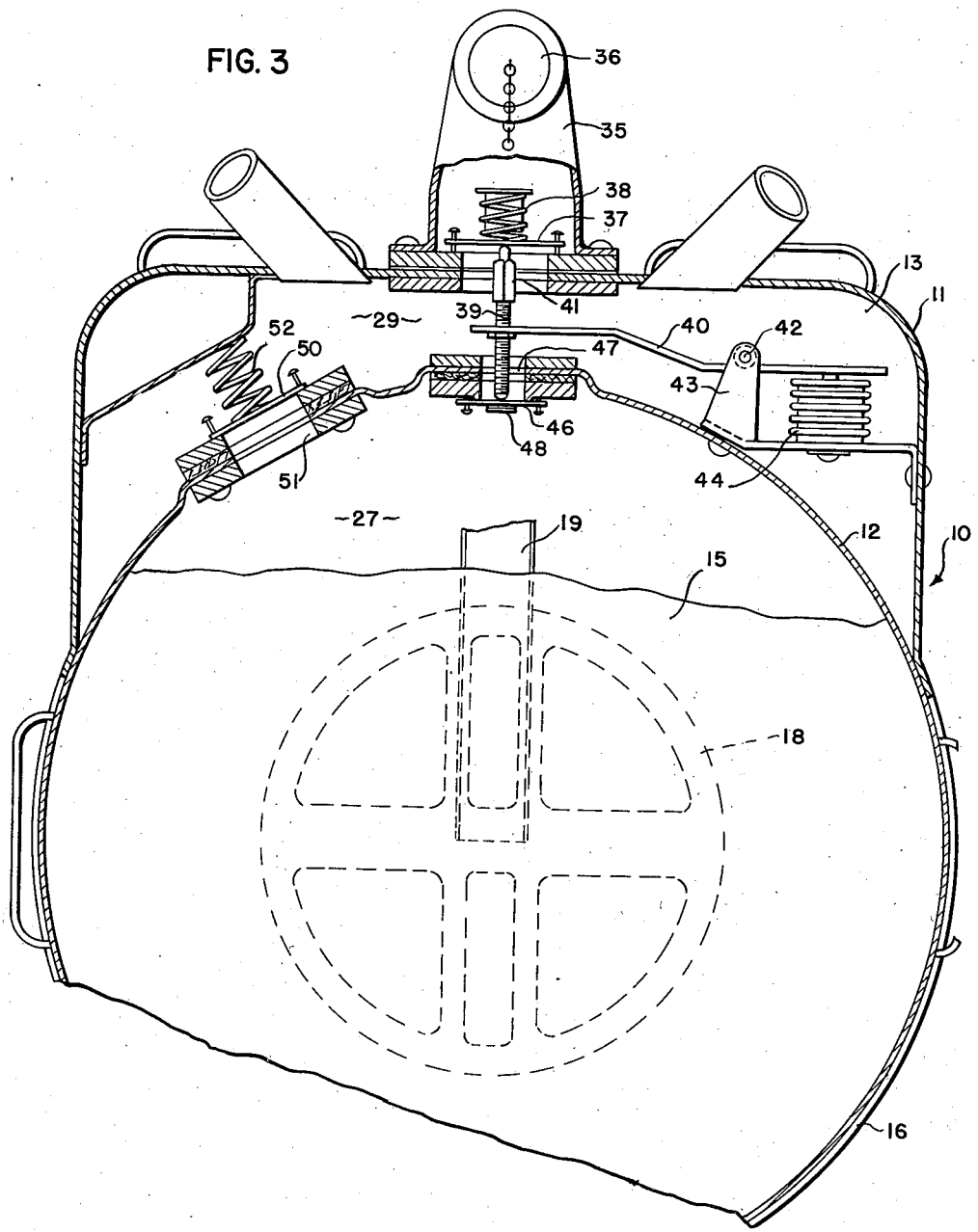

INVENTOR
GEORGE M. DEMING
BY
ATTORNEY

Patented Feb. 2, 1943

2,310,189

UNITED STATES PATENT OFFICE 2,310,189

AIRCRAFT BREATHING REGULATOR

George M. Deming, Orange, N. J., assignor to Air Reduction Company, Incorporated, New York, N. Y., a corporation of New York Application October 11, 1941, Serial No. 414,656

12 Claims. (Cl. 128—202)

This invention relates to breathing regulators for supplying oxygen to aviators.

One object of the invention is to provide an improved aircraft breathing regulator of the demand type, that is, in which the oxygen is supplied only in response to inhalations by the aviator. The invention includes a housing in which there is a respiratory chamber that communicates with the face mask. There are passages through which the respiratory chamber is supplied with air from the ambient atmosphere surrounding the regulator, and with oxygen from an oxygen chamber. Aneroid-operated valve means determine the extent of opening of the passages, and proportion, in accordance with the altitude, the relative amounts of air and oxygen that enter the respiratory chamber.

In one modification of the invention there are check valves closing toward the respiratory chamber, and biased toward closed position, and commanding the passages into the respiratory chamber for air and oxygen, respectively. Abutment means located between the check valves hold the respective check valves open by different amounts at different altitudes. In a modified form of the invention a single valve element, located between confronting passages, is moved toward and from the respective passages to offer different amounts of obstruction to the entrance of air and oxygen into the respiratory chamber. This valve element is preferably operated so as to totally obstruct the oxygen passage at sea level or at low altitudes, and to totally obstruct the air inlet at elevations in excess of about 33,000 ft. This altitude is given as illustrative, as in some instances it may be desirable to totally obstruct the air at some other altitude, for example at 30,000 ft. Between sea level and the chosen altitude of total air obstruction the valve element occupies various intermediate positions, progressively closer to the air inlet as the altitude increases.

Another object of the invention is to provide a breathing regulator with a diaphragm chamber that controls the operation of an oxygen supply valve, and at the same time functions as a rebreathing bag. In attaining this object of the invention the regulator is made of large size, and the diaphragm is given a range of travel beyond the limits of the valve-operating means that contact with the diaphragm. The preferred embodiment of the invention comprises a housing that is substantially higher and wider than it is thick from front to back, and that has a strap by which it is hung around the aviator's neck with the back of the housing resting on his chest.

Other objects, features, and advantages of the invention will appear or be pointed out as the specification proceeds.

In the accompanying drawings, forming part hereof:

Fig. 1 is a front view showing the breathing regulator of this invention connected with an aviator's face mask.

Fig. 2 is an enlarged sectional view taken on the line 2—2 of Fig. 1.

Fig. 3 is a view of the apparatus shown in Fig. 2, partly in front elevation and partly in section along the line 3—3 of Fig. 2.

Figure 4:
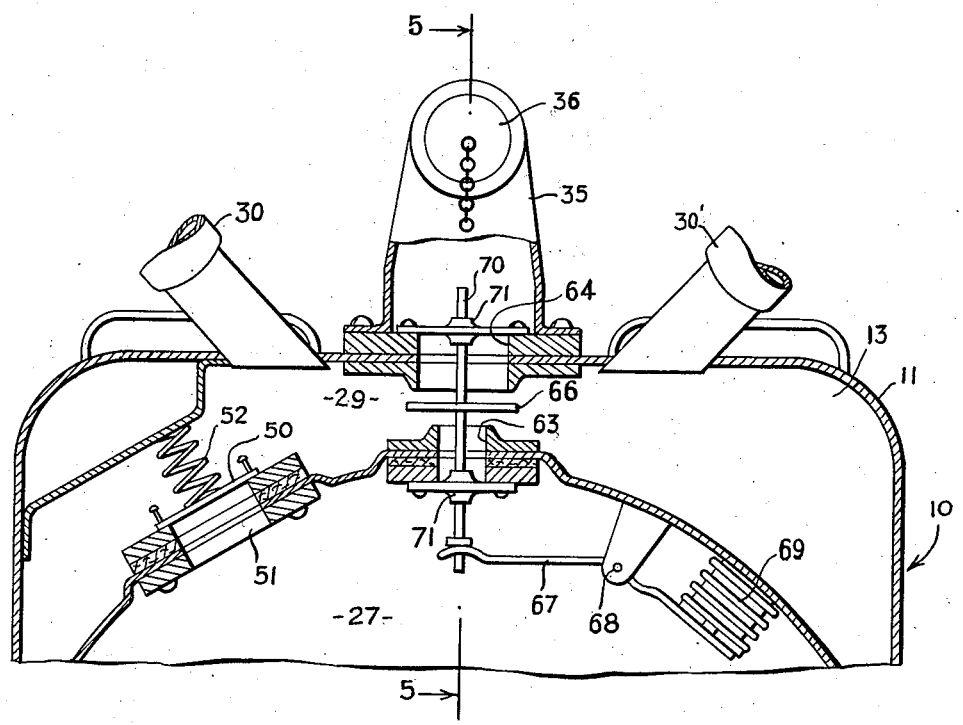
Fig. 4 is a fragmentary sectional view similar to Fig. 3 but showing a modified form of the invention.

The breathing regulator includes a housing 10 made up of two shells 11 and 12 and a removable back plate 13. The shell 12 is circular and dished and has openings 14 in its front and sides. A diaphragm 15 has its peripheral edge clamped to the edge of the shell 12 by a clamping ring 16.

The center region of the diaphragm 15 is covered by a diaphragm plate 18 which is secured to the diaphragm and preferably of light metal. A valve-operating lever 19 contacts with the diaphragm plate 18 and has a fulcrum 20 at the lower end of an inlet fitting 21. This fitting extends through both of the shells 11 and 12 and on its upper end has a hose connector 22 for connecting the breathing regulator with a source of oxygen.

The diaphragm 15 can move forward (to the right in Fig. 2) until it strikes the shell 12. This movement is beyond the limit of travel of the lever 19, the diaphragm 15 moving forward independently of the lever 19 after the latter reaches its limit of movement. The purpose of providing for this movement of the diaphragm in addition to that necessary for operating the lever 19 is to obtain a large volume or reservoir for rebreathing.

An oxygen regulating valve 23 closes against a seat 24 in the fitting 21. This valve is operated by a plunger or stem 25 which is displaced by the lever 19. The valve 23 acts as a pressure reducing valve for reducing the pressure of the oxygen, that is supplied to the fitting 21 at a pressure of the order of ten pounds per square inch (gauge), to substantially the same pressure as the atmosphere outside of the breathing regulator. The valve 23 is urged toward closed position by the velocity and upstream pressure of the oxygen. The plunger or stem 25 is displaced by the lever 19 to open the valve 23 when the pressure against the front (right side in Fig. 2) of the diaphragm 15 is greater than the pressure in the oxygen chamber 27 between the diaphragm 15 and the back plate 13. The pressure in the chamber 27 is actually very slightly below the existing atmospheric pressure outside of the breathing regulator.

In the upper part of the housing 10, between the shells 11 and 12, there is a respiratory chamber 29. Oxygen, air, or an oxygen-air mixture is withdrawn from the chamber 29 through two outlet tubings 30 and 30' (Fig. 1) that lead to a face mask 31 worn by the aviator. These outlet tubings 30 and 30' are preferably rubber and corrugated for greater strength and flexibility. The housing 10 rests on the aviator's chest and is supported by a strap 33 that passes over the aviator's shoulders and around the back of his neck.

Air from the surrounding atmosphere enters the chamber 29 through an air intake 35. A plug 36 can be used to close the air intake 35 if the aviator wants to breathe oxygen at low altitudes undiluted with air from the surrounding atmosphere. When the plug 36 is removed, the entrance of air into the mixing or respiratory chamber 29 is controlled by an air-proportioning valve 37 that is biased toward closed position by a light spring 38 and opened against the force of the spring 38 by abutment means comprising a threaded rod 39 that passes through and is connected with a lever 40. A head 41 threaded on the upper end of the rod 39 can be screwed up or down to adjust the length of the abutment means.

The lever 40 is supported by a fulcrum pivot 42 (Fig. 3) on a bracket 43 secured to the shell 12. The end of the lever 40 remote from the stud 39 is connected with an aneroid bellows 44 which shifts the lever 40 counterclockwise with increase of altitude, and moves the lever 40 in the opposite direction as the altitude decreases. Thus the air-proportioning valve 37 is widest open at sea level and moves progressively toward closed position with increase in altitude. The parts are so constructed that the head 41 permits the valve 37 to close completely at about 33,000 ft., but this valve is a check valve opening toward the air inlet 35 and it will rise to permit gas to be exhausted from within the respiratory chamber 29 whenever the pressure in that chamber is sufficient to lift the valve 37.

An oxygen-proportioning valve 46 controls the passage of oxygen through an oxygen inlet 47 that opens from the oxygen chamber 27 into the respiratory chamber 29. The valve 46 is urged toward closed position by a leaf spring 48 and is opened against the tension of the spring by the threaded rod 39. Movement of the lever 40 to change the position of the valve 37 has the opposite effect on the valve 46 which is completely closed at sea level and opens progressively wider with increase in altitude.

The breathing regulator supplies air with no oxygen enrichment at sea level, and pure oxygen at altitudes above about 33,000 ft. At intermediate altitudes, mixtures of air and oxygen are supplied, the percentage of oxygen being increased automatically with altitude in accordance with the needs of the aviator.

In order to breathe pure oxygen at sea level, or for that matter at any altitude lower than about 33,000 ft., it is only necessary to insert the plug 36 into the air intake 35 and cut off the supply of air. When this is done, a check valve 50 will open to admit oxygen from the oxygen chamber 27 into the respiratory chamber 29 through a bypass 51. The valve 50 is biased toward closed position by a spring 52 which is very light and permits the valve 50 to open when the pressure in the respiratory chamber 29 drops approximately .3" of water below the pressure in the oxygen chamber 27. This means that one can use the regulator at sea level while undertaking exercise to avoid possibilities of aeroembolism.

For the sake of economy in operation, and inasmuch as the human organism is adapted to function satisfactorily at the lower altitudes, it is possible to adjust the regulator so that no oxygen will be supplied at the very low altitudes. For example, if there is a slight clearance provided between the oxygen valve 46 and the lower end of the rod 39, a moderate altitude will be necessary before any oxygen is supplied. The rod 39 threads through the lever 40 and clearance at sea level between the oxygen valve 46 and the lower end of the rod 39 can be obtained by screwing the rod 39 higher in the lever 40. In order to prevent such an adjustment of the rod 39 from affecting the degree of opening of the air-proportioning valve 37, the head 41 can be screwed down on the rod 39 by the same amount that the rod 39 was screwed up in the lever 40. The head 41 movable axially on the rod 39, and the rod 39 threaded through the lever 40, make possible a wide range of adjustment of the operation of the valves 37 and 46 with respect to the bellows 44.

The valve 46 is a check valve opening toward the chamber 27 and will open to admit exhaled air into the chamber 27, for rebreathing, regardless of the altitude. Valve 50 permits the air to be rebreathed.

Fig. 4 shows a modified form of the invention. Much of the construction is similar to that of Figs. 2 and 3 and corresponding parts are indicated by the same reference characters as in Figs. 2 and 3.

Figure 5:
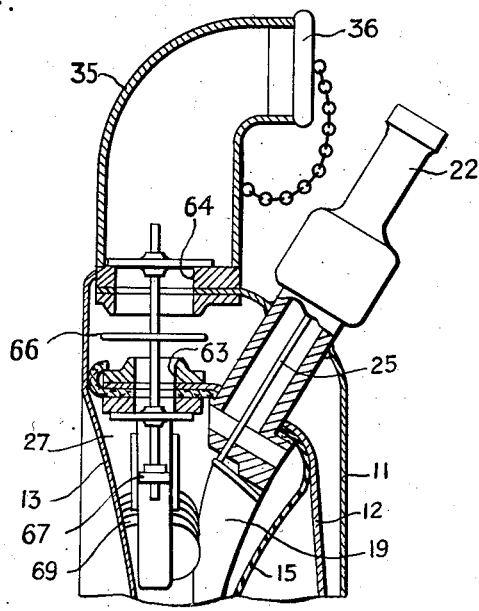
Fig. 5 is a sectional view on the line 5—5 of Fig. 4.

In Figs. 4 and 5 the respiratory chamber 29 communicates with a face mask through the conduits 30 and 30', has a passage 63 opening into the oxygen chamber 27, and an air inlet 64. Instead of having check valves in the air inlet and in the passage to the oxygen chamber, the modified form of the invention shown in Figs. 4 and 5 has a single valve element 66 located between the air inlet 64 and the passage 63. This valve element 66 is connected with a lever 67 that is moved on a pivot 68 by an aneroid bellows 69 located in the oxygen chamber. The valve element 66 has a stem 70 that slides in guides 71.

The relation of the valve element 66 to the bellows 69 is such that the valve element is held in position to completely close the passage 63 and shut off all oxygen to the respiratory chamber at sea level. At an altitude of approximately 33,000 ft. the valve element 66 is in position to close the air inlet 64 so that only oxygen is admitted to the respiratory chamber 29.

At intermediate altitudes, the valve element 66 permits gas to flow into the respiratory chamber 29 through both the passage 63 and inlet 64, but the valve element 66 does offer some obstruction to the flow of gas through these openings 63, 64. With the valve element 66 in a mid position it offers the same obstruction to the flow of both the air and oxygen, and the gas drawn into the respiratory chamber 29 is approximately half air from inlet 64, and half oxygen from passage 63. At low altitudes, with the valve element closer to the passage 63 than to the air inlet, there is more air than oxygen drawn into the respiratory chamber 29. As the altitude increases and the valve element 66 moves progressively away from the oxygen passage 63 and closer to the air inlet 64, the percentage of oxygen drawn into the respiratory chamber 29 increases.

Two embodiments of the invention have been described but others can be made, and those illustrated can be changed or modified. Some features of the invention can be used without others. Terms of orientation are, of course, relative.

I claim:

1. A demand-type breathing regulator including a housing in which is a reduced-pressure chamber, a diaphragm forming one wall of the chamber, a valve operated from the diaphragm for controlling the admission of oxygen to said chamber, a respiratory chamber, a conduit for communicating between the respiratory chamber and a face mask, said conduit being open for return flow of exhaled air from the face mask to the respiratory chamber, and a passage through which oxygen and air can flow back and forth between the respiratory chamber and the reduced-pressure chamber, the diaphragm of the reduced-pressure chamber being of large size and displacement so that the reduced-pressure chamber of the regulator serves as a rebreathing bag for the face mask.

2. A breathing regulator having a reduced-pressure chamber, and including a valve that controls the admission of oxygen from an oxygen supply line to said reduced-pressure chamber, a diaphragm forming one wall of the reduced-pressure chamber and exposed on one side to the pressure of the ambient atmosphere, motion-transmitting connections through which movement of the diaphragm causes operation of the valve, said diaphragm being movable beyond the limit of movement of the motion-transmitting means to increase the capacity of the chamber for use as a rebreathing bag, a second chamber having a passage communicating with the reduced-pressure chamber and through which oxygen or oxygen-air mixtures flow back and forth between said chambers, and a conduit for connecting the second chamber with a face mask.

3. A demand-type breathing regulator comprising a housing in which is a reduced-pressure chamber and a connecting conduit through which the regulator connects with a face mask, the reduced-pressure chamber having a passage through which it opens into said connecting conduit, a check valve commanding said passage and opening toward the reduced-pressure chamber, a device for holding the check valve open so that oxygen from the reduced-pressure chamber can flow through said passage and into the connecting conduit, and an aneroid bellows connected with the device for moving said device into different positions in response to variations in the pressure of the atmosphere surrounding the breathing regulator.

4. A breathing regulator including a respiratory chamber, a reduced-pressure chamber having a passage opening into the respiratory chamber, an oxygen inlet through which oxygen enters the reduced-pressure chamber, a valve commanding the oxygen inlet, operating means for said valve responsive to the pressure in said reduced-pressure chamber, an air inlet through which air enters the respiratory chamber from outside the regulator, a connection for joining the respiratory chamber with a face mask, and valve means in the regulator in position to control the relative proportion of gas that enters the respiratory chamber through the passage from the reduced-pressure chamber and through an air inlet from the atmosphere.

5. In an aircraft breathing regulator that has a respiratory chamber, a reduced-pressure chamber, a pressure-responsive valve for controlling the entrance of oxygen into the reduced-pressure chamber, and a connection through which the respiratory chamber communicates with a face mask, two gas inlets opening into the respiratory chamber, one from the reduced-pressure chamber of the regulator and the other from the atmosphere surrounding the regulator, valve means controlling the flow of gas through both of said gas inlets, and an aneroid device operably connected with the valve means for moving said valve means to change the amount of opening of both gas inlets in a manner that admits different proportions of incoming gas through different ones of said inlets at different altitudes.

6. An aircraft breathing regulator including a housing in which is a chamber for oxygen and a respiratory chamber, a diaphragm forming a wall of the oxygen chamber, an oxygen inlet conduit, a valve for controlling the entrance of oxygen into the oxygen chamber through said inlet conduit, motion-transmitting connections between the diaphragm and valve for causing operation of the valve, a second valve for controlling the passage of gas from the oxygen chamber through an inlet to the respiratory chamber, a third valve for controlling the entrance of air from the ambient atmosphere through an air inlet into the respiratory chamber, and aneroid-operated means operably connected with the second and third valves for varying the degree of opening of the respective valves in opposite directions in response to changes in altitude of the regulator.

7. A breathing regulator for aviators including a housing in which is an oxygen chamber and a respiratory chamber, the respiratory chamber having two substantially alined openings, one communicating with the oxygen chamber and the other with the ambient atmosphere, a check valve commanding each of said openings, each of said check valves having a bias toward closed position and closing toward the respiratory chamber, abutment means located between the check valves and movable in opposite directions into positions to hold one or the other of said check valves open, and an aneroid bellows connected to the abutment means for making the position of the abutment means dependent upon the atmospheric pressure surrounding the regulator.

8. A breathing regulator as defined in claim 7, and in which the abutment means comprises a threaded rod with a head that can be screwed one way or the other on the rod to vary the length of said abutment means, and in which the bellows is connected to a lever through which said rod passes and in which the rod is adjustable axially to change the effect of the bellows at a given altitude.

9. An aircraft breathing regulator including an oxygen chamber, pressure regulator apparatus for controlling the admission of oxygen from a high-pressure source into said oxygen chamber, a respiratory chamber, a valve commanding a passage between the oxygen chamber and the respiratory chamber, a second valve commanding a passage between the respiratory chamber and the outside atmosphere surrounding the regulator, said second valve having a bias toward closed position, but opening away from the respiratory chamber for the exhaust of air from the respiratory chamber during exhalation by an aviator using the breathing regulator, an aneroid bellows, and means operated by the bellows for holding the valves open by different amounts at different altitudes.

10. An aircraft breathing regulator having an oxygen chamber and a respiratory chamber with a passage that communicates with the oxygen chamber, and including pressure regulator apparatus for controlling the supply of oxygen to the oxygen chamber, a conduit through which the respiratory chamber communicates with a face-mask connection, an air inlet through which air from the surrounding atmosphere enters the respiratory chamber, said air inlet confronting one end of the passage through which said chambers communicate, a valve element that moves between the confronting ends of the passage and air inlet, and an aneroid device for changing the position of the valve element with changes in altitude.

11. An aircraft breathing regulator comprising a housing, the height and width of which are substantially greater than its thickness from front to back, a strap that is placed around an aviator's neck to support the housing with the back of said housing resting against the aviator's chest, a partition within the housing dividing the housing into an oxygen chamber and a respiratory chamber, a flexible diaphragm forming one wall of the oxygen chamber, an oxygen supply valve commanding an oxygen inlet to the oxygen chamber, a plunger for operating the oxygen supply valve, a motion-transmitting lever between the diaphragm and the plunger, said diaphragm being of large size and being movable beyond the limits of movement of the lever in one direction to increase the capacity of the oxygen chamber so that said chamber serves as a rebreathing bag, a passage connecting the oxygen chamber with the respiratory chamber, a check valve biased toward closed position and commanding said passage and opening toward the oxygen chamber, an air inlet through which air from the surrounding atmosphere enters the respiratory chamber, a check valve biased toward closed position and commanding the inlet and opening toward the air inlet, connections for joining the respiratory chamber with a face mask, an aneroid bellows in the respiratory chamber, and elements operated by said bellows for holding the check valves open at certain elevations.

12. An aircraft breathing regulator in which is an oxygen chamber and a respiratory chamber, two passages through which said chambers communicate with one another, a check valve commanding each of the passages, one check valve opening toward the oxygen chamber and the other opening toward the respiratory chamber, both of said check valves being biased toward closed position, an air inlet conduit to the respiratory chamber from the surrounding atmosphere, a check valve commanding the air inlet, and biased toward closed position, and closing toward the respiratory chamber, aneroid-operated means for holding open at certain altitudes both of the check valves that close toward the respiratory chamber, and a device with which a user of the regulator can close the air inlet at any altitude.

GEORGE M. DEMING.